United States Patent
Mannheim Astete et al.

(10) Patent No.: US 12,005,762 B2
(45) Date of Patent: Jun. 11, 2024

(54) VEHICLE GLAZING WITH IMPROVED STIFFNESS

(71) Applicant: AGP America S.A., Panama (PA)

(72) Inventors: Mario Arturo Mannheim Astete, Lima (PE); Juan Pablo Suárez, Lima (PE); Jean-Marie Le Ny, Lima (PE); Guillaume Géranton, Lima (PE)

(73) Assignee: AGP America S.A., Panama (PA)

( * ) Notice: Subject to any disclaimer, the term of this patent is extended or adjusted under 35 U.S.C. 154(b) by 0 days.

(21) Appl. No.: 16/958,699

(22) PCT Filed: Dec. 31, 2018

(86) PCT No.: PCT/IB2018/060743
§ 371 (c)(1),
(2) Date: Jun. 27, 2020

(87) PCT Pub. No.: WO2019/130283
PCT Pub. Date: Jul. 4, 2019

(65) Prior Publication Data
US 2020/0346525 A1  Nov. 5, 2020

Related U.S. Application Data

(60) Provisional application No. 62/612,500, filed on Dec. 31, 2017, provisional application No. 62/633,523, filed on Feb. 21, 2018.

(30) Foreign Application Priority Data

Feb. 22, 2018  (CO) .......................... NC2018/0001897

(51) Int. Cl.
*B60J 1/00* (2006.01)
*B32B 3/30* (2006.01)
*B32B 17/10* (2006.01)

(52) U.S. Cl.
CPC ................. *B60J 1/008* (2013.01); *B32B 3/30* (2013.01); *B32B 17/10036* (2013.01);
(Continued)

(58) Field of Classification Search
CPC ..... B60J 1/001; B60J 1/008; B32B 17/10036; B32B 17/10091; B32B 17/10119;
(Continued)

(56) References Cited

U.S. PATENT DOCUMENTS 3,865,680 A   2/1975  Reese et al.
4,909,820 A * 3/1990  Hirotsu ............... C03B 23/0305
                                                          65/273

(Continued)

FOREIGN PATENT DOCUMENTS

WO   2016196427 A1   12/2016

OTHER PUBLICATIONS

2007 Peugeot 308 RC Z-Concept ; 2007; Conceptcars.com; pp. 1-2 (Year: 2023).*
Peugeot RCZ; 2015; Wikipedia; whole document (Year: 2023).*

*Primary Examiner* — Tahseen Khan
(74) *Attorney, Agent, or Firm* — The Morales Law Firm; Joseph L. Morales

(57) ABSTRACT

A vehicle glazing with improved stiffness having a modified structure which comprises at least one stiffening portion, wherein each portion is a recessed portion and/or a raised portion, and wherein each portion has at least a portion of its contour being sharply curved.

21 Claims, 7 Drawing Sheets

(52) U.S. Cl.
CPC .. *B32B 17/10082* (2013.01); *B32B 17/10091* (2013.01); *B32B 17/10889* (2013.01); *B60J 1/001* (2013.01)

(58) Field of Classification Search
CPC ..... B32B 17/10889; B32B 3/263; B32B 3/28; B32B 3/30; Y10T 428/24479; Y10T 428/24521; Y10T 428/24529; Y10T 428/24612; Y10T 428/24628; Y10T 428/24942; Y10T 428/2495
USPC ........ 428/156, 161, 162, 172, 174, 212, 213
See application file for complete search history.

(56) References Cited

U.S. PATENT DOCUMENTS

| | | | |
|---|---|---|---|
| 5,069,734 A * | 12/1991 | Kavanagh | B29C 51/36 156/99 |
| 5,529,654 A * | 6/1996 | Kavanagh | B32B 17/10889 156/99 |
| 9,421,849 B2 | 8/2016 | Benyahia et al. | |
| 2015/0273986 A1* | 10/2015 | Benyahia | B60Q 1/268 29/854 |
| 2017/0036414 A1* | 2/2017 | Notsu | B60J 1/008 |
| 2017/0320297 A1 | 11/2017 | Bennison et al. | |

* cited by examiner

VEHICLE GLAZING WITH IMPROVED STIFFNESS

FIELD OF THE INVENTION

The present disclosed invention relates to a vehicle glazing with improved stiffness, and more particularly to a thin vehicle glazing with modified structure to improve its stiffness.

BACKGROUND OF THE INVENTION

In response to the regulatory requirements for increased automotive fuel efficiency as well as the growing public awareness and demand for environmentally friendly products, automotive original equipment manufacturers, around the world, have been working to improve the efficiency of their vehicles.

One of the key elements of this strategy to improve efficiency has been the concept of light weighting. Often, more traditional, less expensive, conventional materials and processes are being replaced by innovative new materials and processes which while sometime being more expensive, still have higher utility than the materials and processes being replaced due to their lower weight and the corresponding increase in fuel efficiency. Sometimes, the new materials and processes bring with them added functionality as well in addition to their lighter weight. Vehicle glazing has been no exception.

By reducing the weight of the vehicle substantial improvements can be made in energy consumption. This is especially important for electric vehicles where the improvement directly translates into an increase in the range of the vehicle which is a key consumer concern.

The glazed area of vehicles has been steadily increasing and in the process displacing other heavier materials. The popular large glass panoramic roofs is just one example of this trend. A panoramic roof is a vehicle roof glazing which comprises a substantial area of the roof over at least a portion of both the front and rear seating areas of the vehicle. A panoramic roof may be comprised of multiple glazings and may be laminated or monolithic.

Reducing weight through the thickness in vehicle glazing is a clear trend in the automotive market. However, for some applications, such as roof windows, the thickness cannot be reduced due to stiffness issue. A thin vehicle glazing under pressure load deflects more than a thicker vehicle glazing with the same surface area and shape, especially at high speeds.

It would be advantageous to be able to produce a thinner glazing with improved stiffness.

SUMMARY OF THE INVENTION

Stiffness of a glazing is influenced by the geometry of the glazing as well as the materials of which it is comprised. On the material side, stiffness depends on the modulus of elasticity, also known as Young's Modulus, which is an intrinsic material property. On the geometry side, stiffness depends on size, shape and thickness, among others. Stiffness is proportional to the cube of the thickness.

In this sense, it is an object of the present invention to provide a thin vehicle glazing with modified structure to improve its stiffness.

This object can be attained by a vehicle glazing having a surface comprising at least one stiffening portion. Each portion of the at least one stiffening portion is selected from the group consisting of a recessed portion and a raised portion. Furthermore, each portion of the at least one stiffening portion is formed by bending a surface section, said bent section having at least a portion of its contour being sharply curved.

The present invention thus increases the stiffness of the glazing by making stiffening portions that modify the geometry of the glazing. Depending on the application type (e.g. movable or fixed), the glazing size (e.g. large or small) and the glazing type (e.g. curved/flat, monolithic/laminated) some parameters can be adjusted to improve stiffness. These parameters include, but are not limited to, stiffness portion (s) geometry (size and section), arrangement of the stiffness portion(s) over a glazing, thickness of layers in a laminated glazing and interlayer stiffness in a laminated glazing.

BRIEF DESCRIPTION OF THE DRAWINGS

These features and advantages of the present invention will become apparent from the detailed description of the following embodiments in conjunction with the accompanying drawings, wherein.

DETAILED DESCRIPTION OF THE INVENTION

Figure 1:
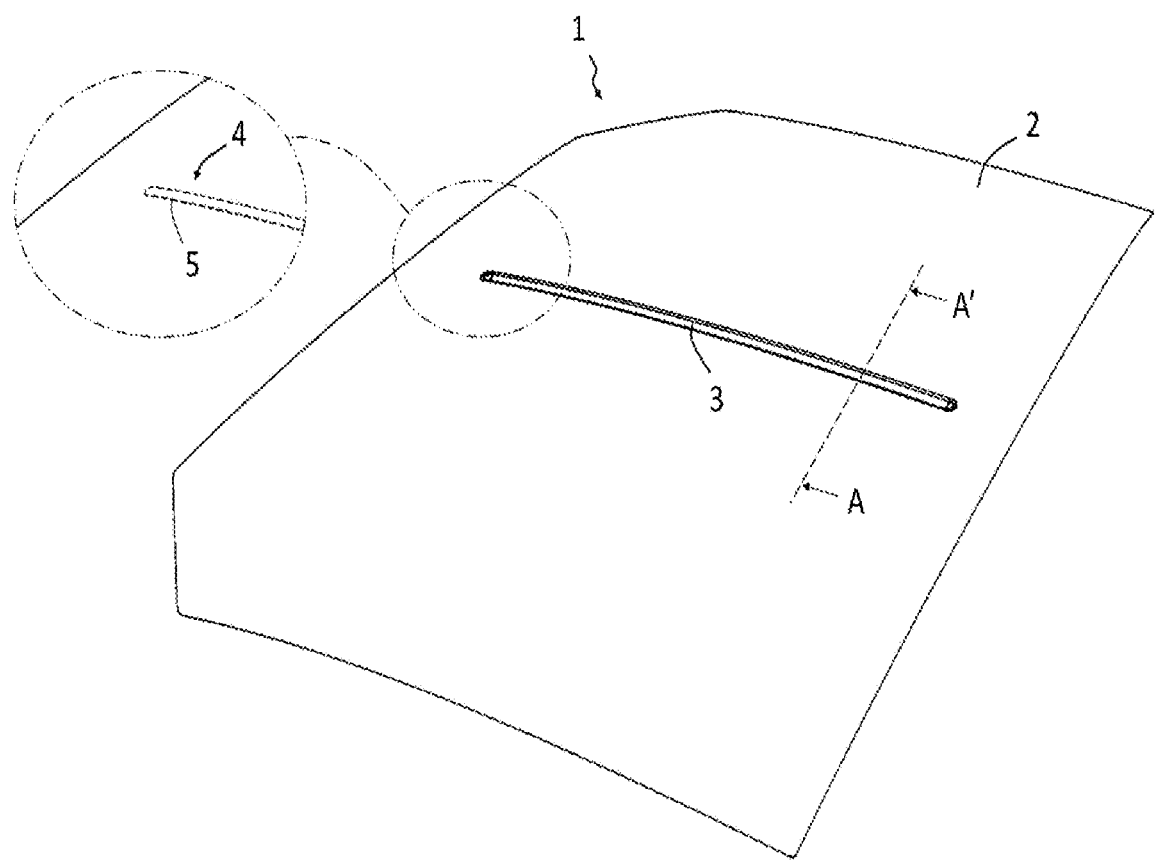
FIG. 1 shows a vehicle glazing with improved stiffness according to a first embodiment of the present invention.

Referring now to the drawings, there are shown preferred embodiments of the vehicle glazing according to the present invention.

Figure 2:
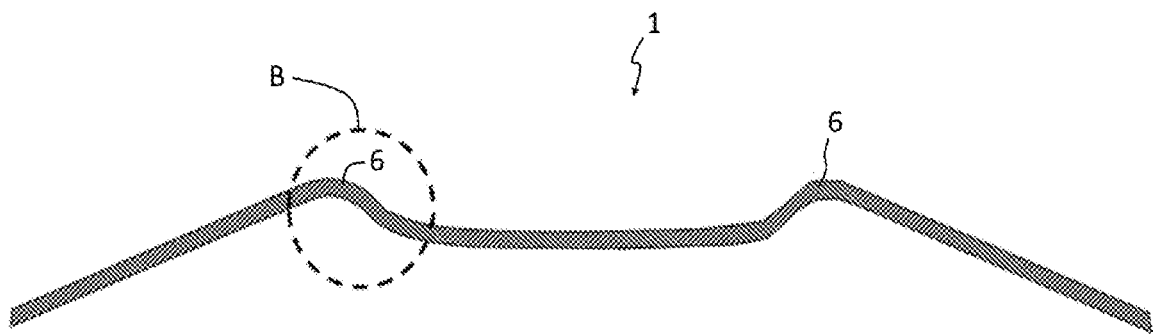
FIG. 2 shows a cross sectional view A-A' of the vehicle glazing depicted in FIG. 1.
Figure 3:
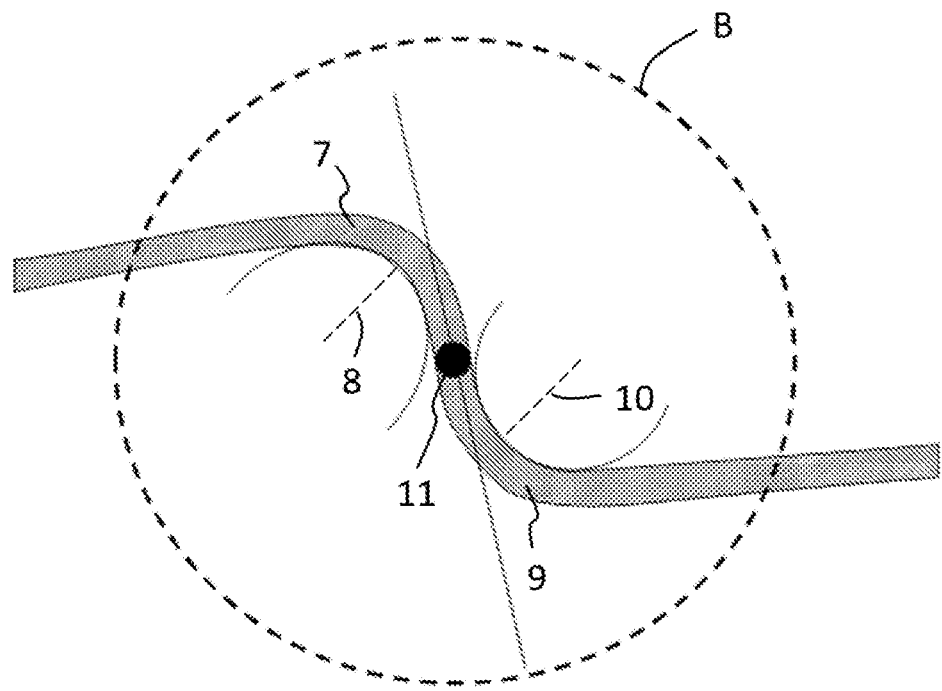
FIG. 3 shows an enlargement of region B shown in FIG. 2.

FIG. 1 shows a curved vehicle glazing 1 having a surface 2 which comprises a stiffening portion 3. The stiffening portion 3 is a recessed portion formed by bending a surface section 4. In this embodiment the section 4 has a substantially rectangular shape with its contour 5 being sharply curved. FIGS. 2-3 show a cross sectional view A-A' of the vehicle glazing 1 depicted in FIG. 1, wherein the sharply curved contour 6 comprises a first bent portion 7 described by a first radius 8 followed by a second bent portion 9 described by a second radius 10. This sharply curved contour 6 has a curved profile with a first direction and a second direction, both directions defined by the curvature with the first radius 8 and the curvature with the second radius 10, respectively; so that the point at which the curved profile changes its direction is an inflection point 11. The first radius 8 and the second radius 10 are less than or equal to about 150 mm, preferably less than or equal to about 50 mm, even more preferably less than or equal to 20 mm. It should be noted that both curvatures can have similar or different radiuses 8, 10.

The inflection point 11 is the point at which the sharply curved contour 6 becomes convex to concave or vice versa, as is shown in FIG. 3. The present invention provides a vehicle glazing with complex curvatures having small or medium radiuses 8, 10. These curvatures are produced by using a bending technique such as press bending, gravity bending, laser-based bending or any other well-known technique. The selected technique (or combined techniques) depends on the size of radiuses. In addition, vacuum can be used to assist in the bending process.

Figure 4:
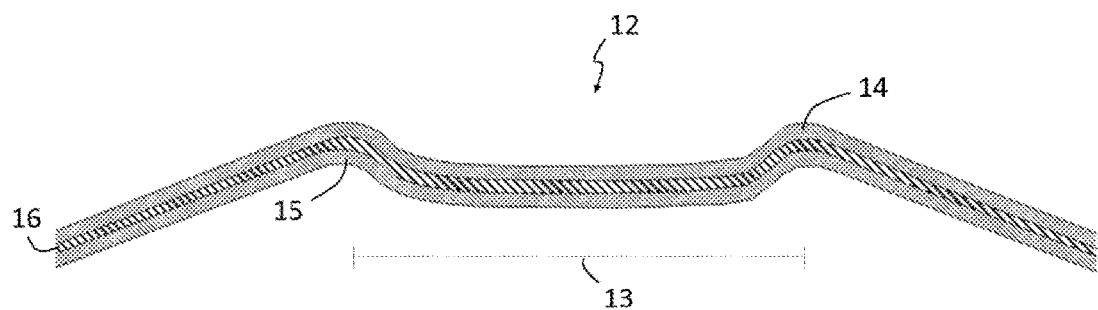
FIG. 4 shows a cross sectional view of a laminated vehicle glazing according to an embodiment of the present invention.

FIG. 4 shows an exemplary embodiment wherein a vehicle glazing 12 having a recessed portion 13 comprises a laminated glazing with two glass layers 14, 15 having a plastic interlayer 16 in between. Laminated glazing 12 is made by bonding two sheets of glass, the outer glass layer 14 and the inner glass layer 15, wherein the inner glass layer 15 can be strengthened or annealed. The plastic interlayer 16 can be a plastic bonding layer comprised of a thin sheet of transparent plastic or thermo plastic interlayer.

Annealed glass is glass that has been slowly cooled from the bending temperature down through the glass transition range. This process relieves any stress left in the glass from the bending process. Annealed glass breaks into large shards with sharp edges. When laminated glazing breaks, the shards of broken glass are held together, much like the pieces of a jigsaw puzzle, by the plastic layer helping to maintain the structural integrity of the glass. A vehicle with a broken laminate 12 can still be operated. The plastic interlayer 16 also helps to prevent penetration by objects striking the laminate 12 from the exterior and in the event of a crash occupant retention is improved.

The plastic bonding interlayer 16 has the primary function of bonding the major faces of adjacent layers to each other. The material selected is typically a clear plastic. For automotive use, the most commonly used plastic bonding interlayer 16 is polyvinyl butyl (PVB). In addition to polyvinyl butyl, ionoplast polymers, ethylene vinyl acetate (EVA), cast in place (CIP) liquid resin and thermoplastic polyurethane (TPU) can also be used.

Plastic Interlayers are available with enhanced capabilities beyond bonding the glass layers together. The invention may include interlayers designed to dampen sound. Such interlayers are comprised whole or in part of a layer of plastic that is softer and more flexible than that normally used. The plastic interlayer may also be of a type which has solar attenuating properties. Standard thicknesses for automotive PVB interlayer are 0.38 mm and 0.76 mm.

In some preferred embodiments the laminated glazing 12 is asymmetric (glass layers having different thickness), wherein the ratio of thickness between outer layer 14 and inner layer 15 is ranging from about 1 to about 8 (e.g. 2.1 mm/0.7 mm). A preferred embodiment also comprises an asymmetric laminated glazing having a flexible plastic interlayer, such as a standard PVB, with a low shear modulus (e.g. about 0.5 MPa). In addition, in several embodiments the plastic interlayer 15 has a shear modulus from about 0.4 MPa to 500 MPa. It should be noted that, for a given laminated glazing thickness, an asymmetric laminated glazing is stiffer than the symmetric one.

In further preferred embodiment (not shown) a laminated glazing comprises at least one glass sheet and at least one plastic interlayer, wherein each glass sheet of said at least one glass sheet has a thickness from 0.5 mm to 5 mm. In addition, in several embodiments the laminated glazing has a height from 500 mm to 2000 mm, a width from 600 mm to 1500 mm and a bending depth less than 400 mm.

Figure 5:
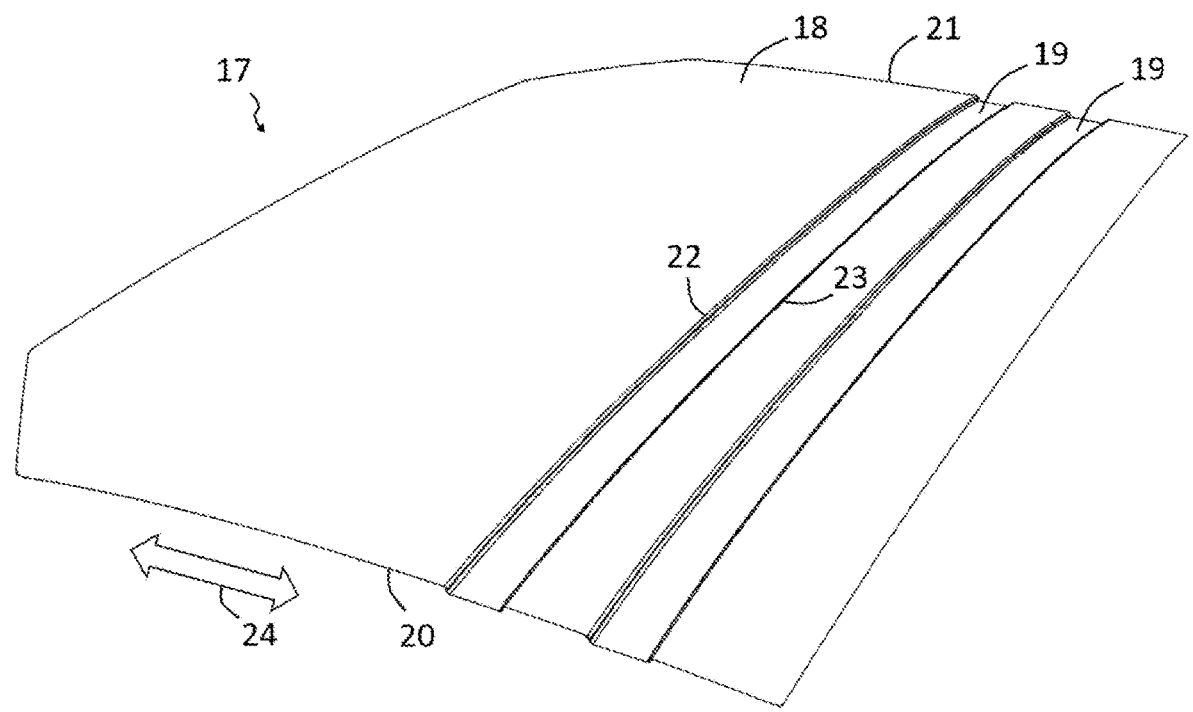
FIG. 5 shows a vehicle glazing with improved stiffness according to a second embodiment of the present invention.

FIG. 5 shows a vehicle glazing 17 having a surface 18 which comprises two stiffening portions 19. The stiffening portions 19 are recessed portions extending from edge 20 to edge 21 across a dimension of the surface 18. In this embodiment each bent section has a substantially rectangular shape with at least a portion of its contour 22, 23 being sharply curved, i.e. only two out of four sides of the rectangular section are sharply curved. Each portion is spaced apart from each other.

The vehicle glazing 17 is a movable roof window fixed on edges 20, 21, parallel to driving direction 24, to a vehicle body. In this embodiment, the stiffening portions 19 are extended perpendicularly to said edges 20, 21.

Figure 6:
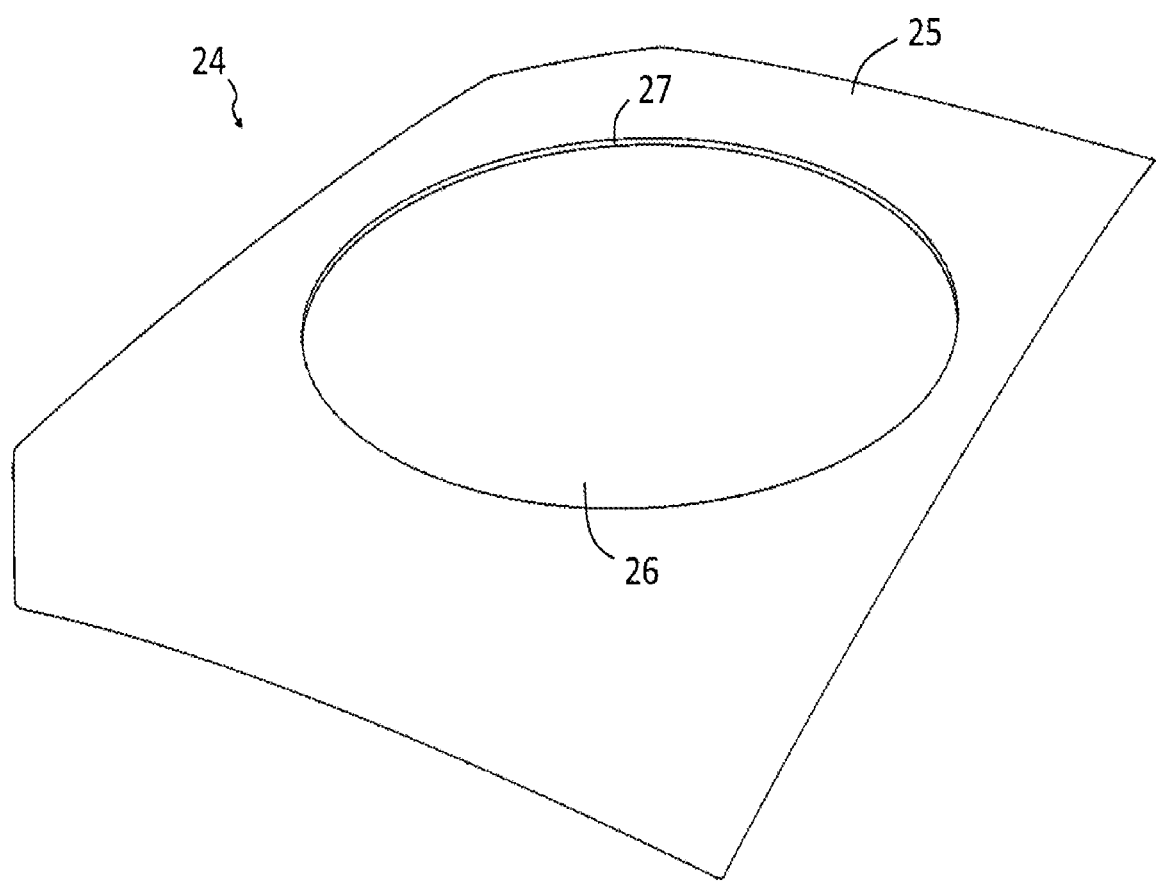
FIG. 6 shows a vehicle glazing with improved stiffness according to a third embodiment of the present invention.

FIG. 6 shows an embodiment wherein a vehicle glazing 24 having a surface 25 comprises one stiffening portion 26. The bent section 27 has a circular shape with the whole contour sharply curved. The vehicle glazing 24 is a tempered monolithic glazing having a thickness from 2.5 mm to 5 mm.

Figure 7:
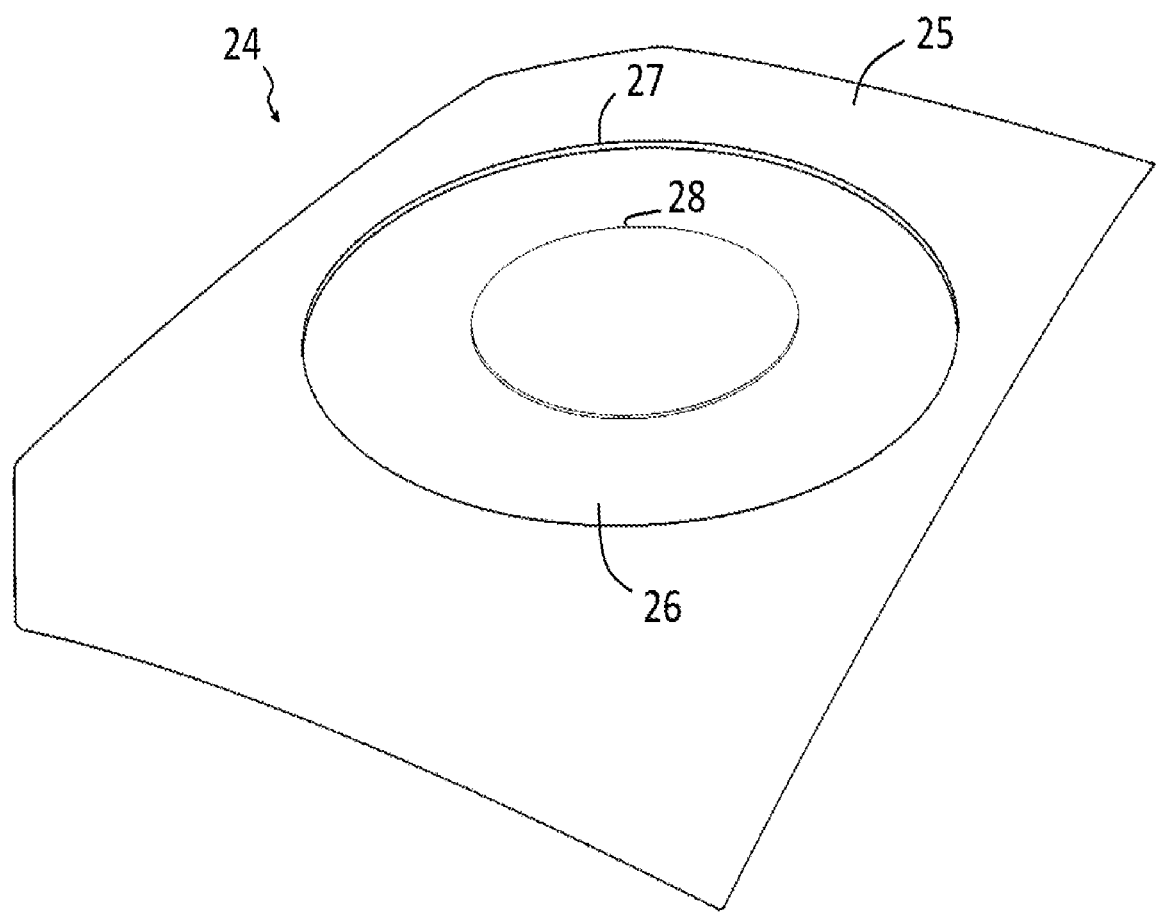
FIG. 7 shows the vehicle glazing with improved stiffness of FIG. 6 with its bent section having a sharply curved interior portion.

FIG. 7 shows the vehicle glazing 24 depicted in FIG. 6, wherein the bent section 27 has a sharply curved interior portion 28. In several embodiments (not shown), the bent section of a stiffening portion has at least one sharply curved interior portion.

Figure 8:
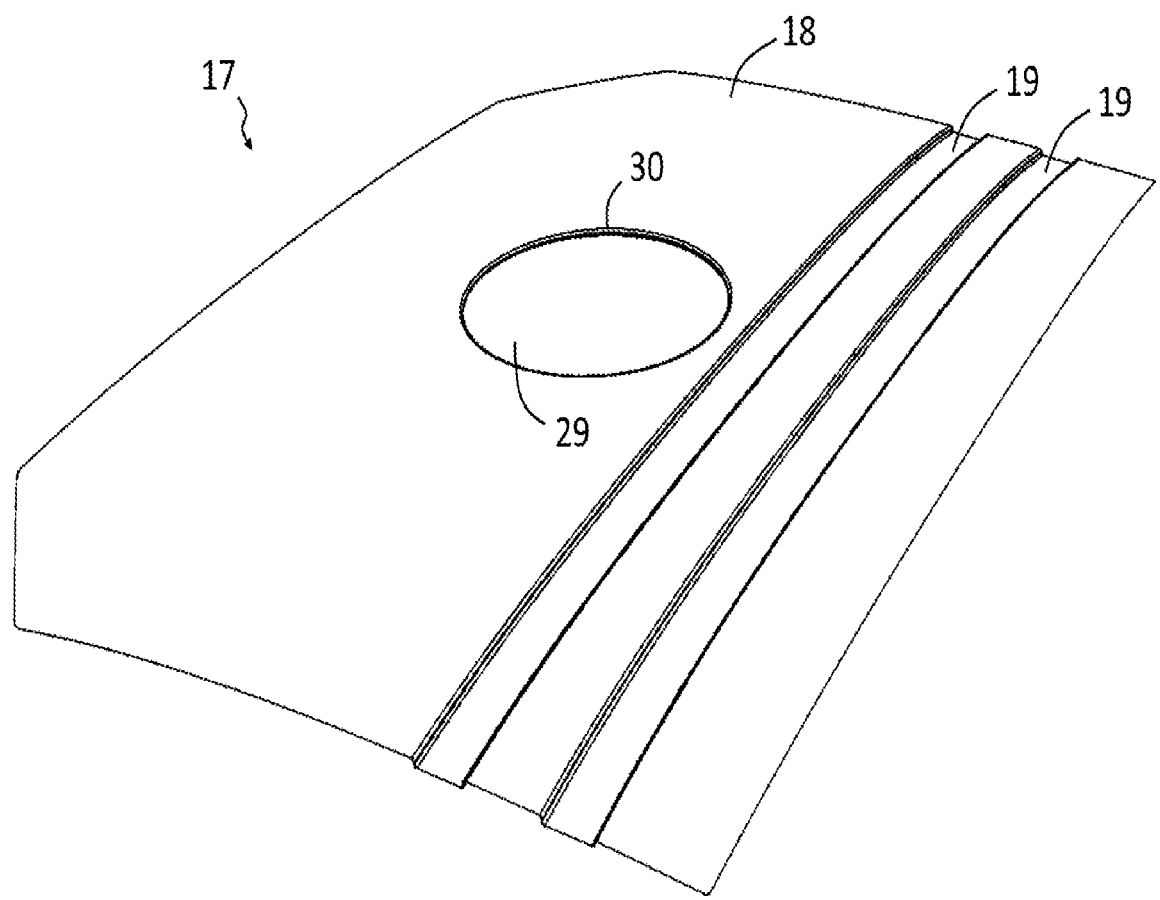
FIG. 8 shows the vehicle glazing with improved stiffness of FIG. 5 with an additional stiffening portion.

FIG. 8 shows the vehicle glazing 17 depicted in FIG. 5, wherein an additional stiffening portion 29 is added. The bent section 30 has a circular shape as the vehicle glazing 24 of FIG. 6.

Figure 9:
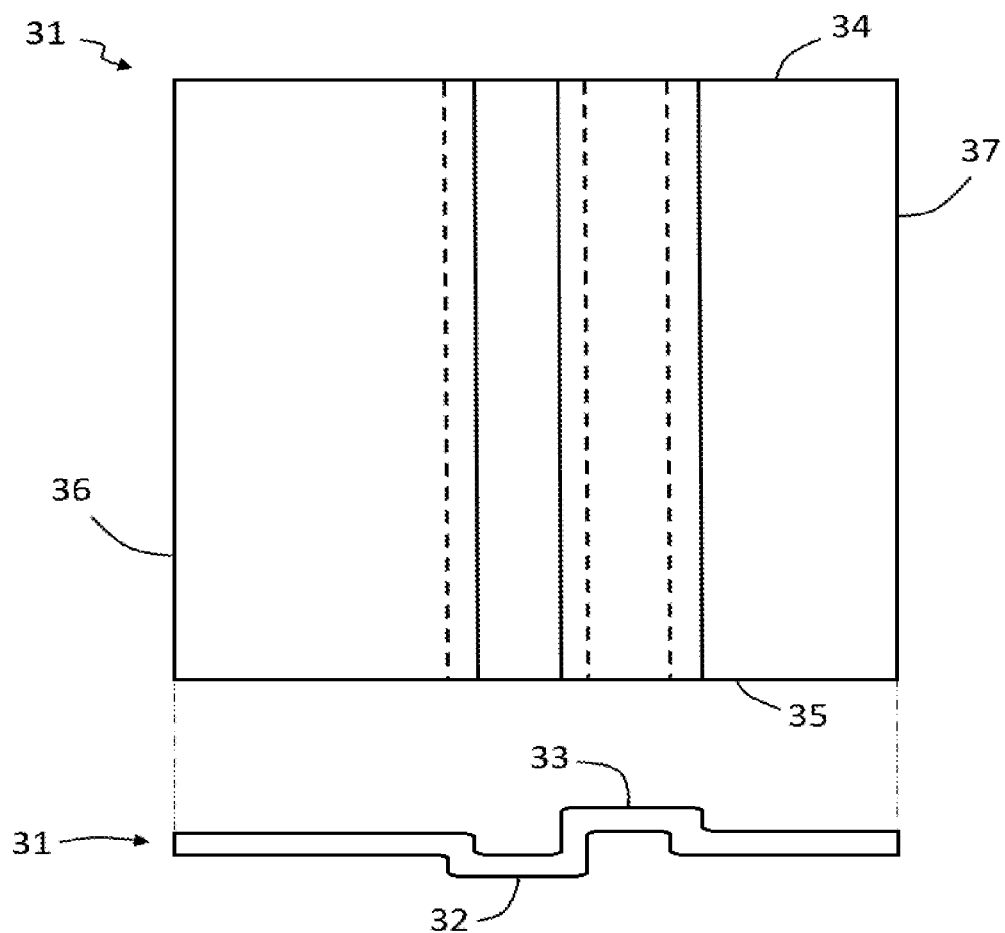
FIG. 9 shows a graphical projection of a vehicle glazing with improved stiffness according to a fourth embodiment of the present invention.

In all the embodiments, each portion of the at least one stiffening portion is selected from the group consisting of a recessed portion and a raised portion. In some embodiments, each portion of the at least one stiffening portion is further selected from the group consisting of a recessed portion followed by a raised portion and a raised portion followed by a recessed portion. FIG. 9 shows a front and top view of a flat vehicle glazing 31 which comprises a recessed portion 32 followed by a raised portion 33. The raised portion 33 is an inverted recessed portion, i.e. a raised portion on one side corresponds to a recessed portion on the opposite side. The flat vehicle glazing 31 is a fixed roof (non-movable) fixed on four edges 34, 35, 36, 37 to a vehicle body.

In some embodiments, the bent section of a stiffening portion has a geometric shape. The geometric shape can be selected from the group consisting of a circle (as in FIG. 6), an oval (not shown), an ellipse (not shown), a polygon (as in FIG. 5) and a polygon with rounded corners (as in FIG. 1). In other embodiments (not shown), the bent section has a non-geometric shape, such as S-shape.

In some embodiments, the vehicle glazing comprises at least one glass sheet. The at least one glass sheet is selected from the group consisting of soda-lime, borosilicate and aluminosilicate. In addition, in several embodiments the vehicle glazing is selected from the group consisting of flat glazing, cylindrical glazing and spherical glazing.

It must be understood that this invention is not limited to the embodiments described and illustrated above. A person skilled in the art will understand that numerous variations and/or modifications can be carried out that do not depart from the spirit of the invention, which is only defined by the following claims.

The invention claimed is:

1. A laminated vehicle glazing with two glass layers, said vehicle glazing, comprising:
   at least one stiffening portion, which modifies the geometry of the two glass layers, each at least one stiffening portion corresponding to a bent section of a surface having at least a portion of its contour being curved;

a plastic interlayer disposed between the two glass layers;

wherein the bent section, in a planar view thereof, has a geometric shape selected from the group consisting of a circle, an oval, an ellipse, a polygon and a polygon with rounded corners;

wherein each portion of the at least one stiffening portion is selected from the group consisting of a recessed portion and a raised portion;

wherein the curved portion comprises a first bent portion described by a first radius and a second bent portion described by a second radius;

wherein the first radius and the second radius are no more than 50 mm;

wherein each stiffening portion extends across a dimension of the glass; and wherein each at least one stiffening portion has a distance between its two furthest points larger than one third of the length of the shortest side of the rectangle's side that subscribes the vehicle glazing.

2. The laminated vehicle glazing of claim 1, wherein said bent section has its whole contour curved.

3. The vehicle glazing with improved stiffness of claim 1, wherein said bent section has at least one sharply curved interior portion.

4. The laminated vehicle glazing of claim 1, wherein the at least one stiffening portion is at least two stiffening portions; and wherein each portion is spaced apart from each other.

5. The laminated vehicle glazing of claim 1, wherein each portion of the at least one stiffening portion is further selected from the group consisting of a recessed portion followed by a raised portion and a raised portion followed by a recessed portion.

6. The laminated vehicle glazing of claim 1, wherein at least one of the two glass layers is selected from the group consisting of soda-lime, borosilicate and aluminosilicate.

7. The laminated vehicle glazing of claim 1, wherein the glazing is a curved vehicle glazing.

8. The laminated vehicle glazing of claim 1, wherein the glazing is the glazing of a roof window.

9. The laminated vehicle glazing of claim 8, wherein the roof window is a moveable roof window.

10. The laminated vehicle glazing with improved stiffness of claim 1, wherein the glazing is a tempered monolithic glazing having a thickness from 2.5 mm to 5 mm.

11. The vehicle glazing with improved stiffness of claim 1, wherein the glazing is a laminated glazing comprising at least one glass sheet and at least one plastic interlayer, said at least one plastic interlayer having a shear modulus from 0.4 MPa to 500 MPa.

12. The vehicle glazing with improved stiffness of claim 11, wherein each glass sheet of said at least one glass sheet has a thickness from 0.5 mm to 5 mm.

13. The vehicle glazing with improved stiffness of claim 11, wherein the laminated glazing has a height from 500 mm to 2000 mm, a width from 600 mm to 1500 mm and a bending depth less than 400 mm.

14. The laminated vehicle glazing of claim 1, wherein the at least two glass layers have different thickness.

15. The laminated vehicle glazing of claim 14, wherein the two glass layers, outer layer and inner layer have a ratio of thickness between outer layer and inner layer is ranging from about 1 to about 8.

16. The laminated vehicle glazing of claim 15, wherein the outer layer is a soda-lime glass layer having a thickness from 1.6 mm to 2.5 mm, and the inner layer is a semi-tempered or annealed soda-lime glass layer having a thickness from 1 mm to 1.6 mm.

17. The laminated vehicle glazing of claim 8, wherein the roof window is fixed on at least two edges to a vehicle body.

18. The laminated vehicle glazing of claim 17, wherein said at least two edges are two edges, and wherein the at least one stiffening portion is extended perpendicularly to said two edges.

19. The laminated vehicle glazing of claim 1, wherein the first radius and second radius are no more than 20 mm.

20. The laminated vehicle glazing of claim 1, wherein the at least one stiffening portion extends from edge to edge across a dimension of the glazing surface.

21. The laminated vehicle glazing of claim 1, wherein each stiffening portion is spaced apart from each other, when several stiffening portions are included in the glazing.

* * * * *